W. Halderman
Jointing Staves.
Nº 21,830. Patented Oct. 19, 1858.
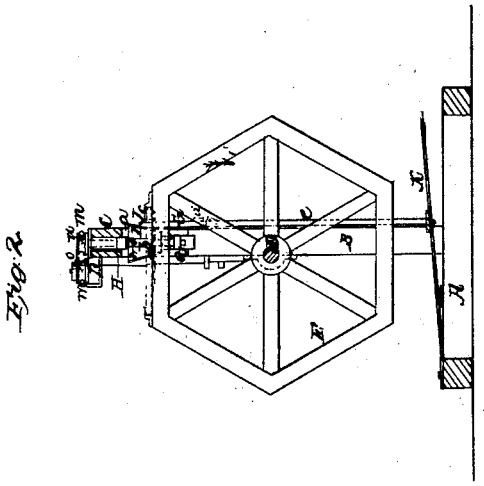
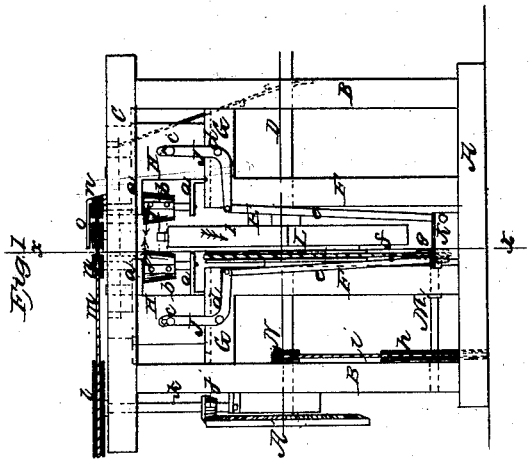

UNITED STATES PATENT OFFICE.

WM. HALDERMAN, OF FREEPORT, ILLINOIS.

STAVE-JOINTER.

Specification of Letters Patent No. 21,830, dated October 19, 1858.

*To all whom it may concern:*

Be it known that I, WILLIAM HALDERMAN, of Freeport, in the county of Stephenson and State of Illinois, have invented a new and Improved Stave-Jointing Machine; and I do hereby declare that the following is a full, clear, and exact description of the same, reference being had to the annexed drawings, making a part of this specification, in which—

Figure 1, is a front view of my invention. Fig. 2, is a vertical section of ditto, taken in the line *x, x*, Fig. 1.

Similar letters of reference indicate corresponding parts in the two figures.

This invention consists in the employment or use of a rotating polygonal feed wheel, in connection with conical cutter heads arranged substantially as hereinafter fully shown and described whereby staves may be jointed in a perfect manner and also dressed or cut in proper taper form for the bilge.

To enable those skilled in the art to fully understand and construct my invention I will proceed to describe it.

A, represents a base or platform and B, B, are the uprights attached thereto and connected at their upper ends by a cross tie C.

D, is a horizontal shaft which has its bearings attached to the uprights B, B. A driving pulley or crank is placed on one end of the shaft and a spur wheel A', is placed on the opposite end. On the shaft D, at about its center a polygonal wheel E is placed loosely, a hexagonal wheel is shown in the drawings but other polygonal forms may be used. The wheel E, is fitted between uprights F, F, on the base or platform and to the upper ends of the uprights F, horizontal bars G, are attached said bars being connected to the uprights B, B.

Between the cross tie C, and bars G, G, slides H, H, are placed which are fitted in grooves in the cross tie and bars are allowed to slide freely therein. To the inner sides of the slides H, H, lateral projections *a*, are attached between which inverted conical cutter heads I, I, are placed, there being one cutter head attached to each slide. Each cutter head has two cutters *b, b*, attached to it at opposite sides of its center, the cutters extending from the lower to the upper ends of the heads.

To each slide H, a bent lever J is attached by a pivot *c*, these levers are attached by fulcrum pins *d*, to the bars G, and the lower ends of the levers J, are attached by rods *e, e*, to a treadle K, which is secured to the base or platform A. The treadle K may be elastic and serve also the function of a spring, keeping the slides H, H, distended. On the shaft D, and adjoining the wheel E, a pulley L, is placed around which a cord or band *f*, passes—said cord or band also passing around a smaller pulley *g*, on a shaft M, near the base or platform. On the shaft M, a larger pulley *h*, is placed around which a cord or band *i*, passes, said cord or band also passing around a small pulley N, on the shaft D. The spur wheel A', gears into a pinion *j*, which is placed on the lower end of a vertical shaft *k*, the upper end of which has a pulley *l*, placed on it, said pulley having a cord *m*, passing around it, which cord passes around pulleys *n, n*, on the shafts of the cutter heads, I, I, and around an idle pulley *o*, which is placed in a yielding bar *p*, the several sides or faces of the polygonal wheel are provided with clamps arranged in any proper way to secure the staves thereto.

The operation is as follows: Power is applied to the shaft D, in any proper manner, and the cutter heads I, I, are rotative from shaft D, in the direction indicated by arrows, Fig. 1, and through the medium of the gearing A', *j* and the belt *m*. The wheel E is also rotative on the shaft D, with a comparatively slow movement, through the medium of the belts *f, i*, the relative size of the pulleys N, *h, g,* L, being such as to insure said movement. The wheel E, rotates in the direction indicated by arrow 1, and the operator as the wheel rotates places the staves on its several sides and as the staves pass between the cutter heads, the cutters *b*, joint the same cutting their edges obliquely owing to the oblique or inclined position of the cutters *b*, and these cutters are placed at such an angle of inclination that they will correspond precisely with radii of the barrel for which the staves are intended. The wheel E being of polygonal shape it will be seen that the several staves are passed between the cutter heads at varying parts of their height, for instance, when the stave first enters its end will be cut by the upper parts of the cutters *b, b*, and the staves while passing through will gradually decrease and be cut by the lower parts of the cutters at its center the stave then gradually rises and is cut by the upper portion of the cutters.

By this means the staves will be jointed in taper form for the bilge the widest part being at the center and gradually tapering outward toward each end. As the staves may vary in width to some extent the difference may be compensated for by operating the treadle K, with the foot by which the cutter heads may be brought up to the edges of the stave.

By this invention a very simple and efficient stave jointing machine is obtained, one that may be readily manipulated constructed at a small cost, and not liable to get out of repair.

I would remark that any polygonal formed wheel may answer, but the hexagonal form will probably be preferable. I would also state that any proper discharging device may be attached to the machine to throw the finished staves from the wheel as they leave the cutters.

Having thus described my invention what I claim as new and desire to secure by Letters Patent, is—

The combination of the rotating conical cutter heads I, I, and the polygonal feed wheel E, arranged for joint action substantially as and for the purpose set forth.

WILLIAM HALDERMAN.

Witnesses:
D. C. McKercher,
M. E. Harnish.